United States Patent
Cho et al.

(10) Patent No.: US 10,116,169 B2
(45) Date of Patent: Oct. 30, 2018

(54) WIRELESS POWER TRANSMITTER AND METHOD FOR CONTROLLING RESONANCE FREQUENCY USING THE SAME

(71) Applicant: SAMSUNG ELECTRO-MECHANICS CO., LTD., Suwon-si (KR)

(72) Inventors: Sang Ho Cho, Suwon-si (KR); Seung Won Park, Suwon-si (KR); Tae Sung Kim, Suwon-si (KR); Eun Young Shin, Suwon-si (KR); Jae Suk Sung, Suwon-si (KR); Chang Ik Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 282 days.

(21) Appl. No.: 15/078,188

(22) Filed: Mar. 23, 2016

(65) Prior Publication Data

US 2017/0093217 A1 Mar. 30, 2017

(30) Foreign Application Priority Data

Sep. 25, 2015 (KR) ........................ 10-2015-0137000

(51) Int. Cl.
| | | |
|---|---|---|
| *H01F 27/42* | (2006.01) | |
| *H01F 37/00* | (2006.01) | |
| *H01F 38/00* | (2006.01) | |
| *H02J 50/12* | (2016.01) | |
| *H02J 7/02* | (2016.01) | |

(52) U.S. Cl.
CPC .............. *H02J 50/12* (2016.02); *H02J 7/025* (2013.01)

(58) Field of Classification Search
CPC . H02J 5/005; H02J 7/025; H02J 17/00; H01F 38/14; B60L 11/182
USPC ........................................................ 307/104
See application file for complete search history.

(56) References Cited

U.S. PATENT DOCUMENTS

| | | | |
|---|---|---|---|
| 2012/0175968 A1* | 7/2012 | Katsunaga | B60L 11/182 307/104 |
| 2014/0203657 A1* | 7/2014 | Song | H02J 50/12 307/104 |
| 2014/0203658 A1* | 7/2014 | Taguchi | H01M 10/46 307/104 |
| 2015/0061577 A1* | 3/2015 | Ye | H02J 7/025 320/108 |
| 2015/0061580 A1 | 3/2015 | Yamakawa et al. | |

(Continued)

FOREIGN PATENT DOCUMENTS

| | | |
|---|---|---|
| JP | 2013-183497 A | 9/2013 |
| KR | 10-2013-0005571 A | 1/2013 |

(Continued)

OTHER PUBLICATIONS

Korean Office Action issued on Oct. 28, 2016 in counterpart Korean Application No. 10-2015-0137000 (14 pages in Korean with English translation).

*Primary Examiner* — Quan Tra
(74) *Attorney, Agent, or Firm* — NSIP Law

(57) ABSTRACT

A wireless power transmitter includes resonators electrically connected to each other and a resonance frequency varying unit configured to vary resonance frequencies of the resonators based on a change in an amount of power to be sent to a wireless power receiver from the wireless power transmitter.

14 Claims, 8 Drawing Sheets

(56) References Cited

U.S. PATENT DOCUMENTS

| | | | | |
|---|---|---|---|---|
| 2016/0036243 A1* | 2/2016 | Hayashi | ............ | H02J 5/005 |
| | | | | 307/104 |
| 2017/0040846 A1* | 2/2017 | Sankar | ............ | H04B 5/0031 |
| 2017/0126071 A1* | 5/2017 | Aioanei | ............ | H02J 50/12 |

FOREIGN PATENT DOCUMENTS

| KR | 10-2013-0087708 A | 8/2013 |
|---|---|---|
| WO | WO 2014/030773 A1 | 2/2014 |

* cited by examiner

WIRELESS POWER TRANSMITTER AND METHOD FOR CONTROLLING RESONANCE FREQUENCY USING THE SAME

CROSS-REFERENCE TO RELATED APPLICATION

This application claims the benefit under 35 USC § 119(a) of Korean Patent Application No. 10-2015-0137000 filed on Sep. 25, 2015, in the Korean Intellectual Property Office, the entire disclosure of which is incorporated herein by reference for all purposes.

BACKGROUND

1. Field

The following description relates to a wireless power transmitter and a method for controlling a resonance frequency using the same.

2. Description of the Related Art

In the field of wireless technology, non-contact wireless power charging devices may allow electronic devices to be charged with power in a non-contact state.

Typically, settings for wireless charging may be fixed. That is, a target device of the wireless charging may be set in a fixed position near a wireless power receiver in order to effectively charge the target device.

Thus, in a case in which a wireless charging environment is unstable, such as when the target device of wireless charging is changed or moved, the wireless power receiver changes positions, wireless charging may not be properly performed or the effectiveness of the wireless charging may be decreased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A wireless power transmitter includes resonators electrically connected to each other and a resonance frequency varying unit configured to vary resonance frequencies of the resonators based on a change in an amount of power to be sent to a wireless power receiver from the wireless power transmitter.

Upon the amount of power to be sent to the wireless power receiver being an amount greater than or equal to a first threshold value, the resonance frequency varying unit may be configured to increase the resonance frequencies of the resonators.

Upon the amount of power to be sent to the wireless power receiver being an amount less than or equal to a second threshold value, the resonance frequency varying unit may be configured to decrease the resonance frequencies of the resonators.

The resonance frequency varying unit may vary the resonance frequencies of the resonators by varying capacitance levels of the resonators.

The wireless power transmitter may include an inverter unit configured to operate the resonators by performing a switching operation, and the resonance frequency varying unit may be configured to vary the resonance frequencies of the resonators based on a change in a received voltage from the inverter unit.

The wireless power transmitter may include a power supply unit configured to transform a received voltage and output the transformed input voltage and an inverter unit configured to receive an output of the power supply unit and operate the resonators by performing a switching operation.

The resonance frequency varying unit may be configured to vary the resonance frequencies of the resonators based on a change in a received current from the power supply unit.

The wireless power transmitter may include a control unit configured to identify the amount of power to be sent to the wireless power receiver and control the output of the power supply unit based on the identified amount of power to be sent to the wireless power receiver.

The resonance frequency varying unit may include a variable capacitor having a first terminal electrically connected to the resonators and a capacitance controller configured to adjust a capacitance of the variable capacitor depending on a comparison result between a received voltage from the inverter unit and a set threshold voltage.

The variable capacitor may have a second terminal electrically connected to an output terminal of the inverter unit.

The resonators may be electrically connected in parallel.

A method for controlling a resonance frequency includes identifying an amount of power to be sent from a wireless power transmitter to a wireless power receiver and varying a resonance frequency of the wireless power transmitter in response to a change in the amount of power to be sent to the wireless power receiver.

The wireless power transmitter may include resonators, and a one variable capacitor configured to vary capacitance levels of the resonators, and the varying of the resonance frequency of the wireless power transmitter may include varying resonance frequencies of the resonators by varying the capacitance levels of the resonators.

The varying of the resonance frequencies of the resonators may include increasing the resonance frequencies when amount of power to be sent to the wireless power receiver is greater than or equal to a first threshold amount.

The varying of the resonance frequencies of the resonators may include decreasing the resonance frequencies when the amount of power to be sent to the wireless power receiver is less than or equal to a second threshold amount.

The varying of the resonance frequencies of the resonators may include increasing an input voltage of an inverter when the amount of power to be sent to the wireless power receiver is increased and increasing the resonance frequencies of the resonators upon the input voltage of the inverter being greater than or equal to a threshold voltage.

The varying of the resonance frequencies of the resonators may include decreasing an input voltage of an inverter when the amount of power to be sent to the wireless power receiver is decreased and increasing the resonance frequencies of the resonators upon the input voltage of the inverter being greater than or equal to a threshold voltage.

The resonators may be electrically connected in parallel.

Accordingly, a wireless power transmitter may perform wireless charging in an environment in which an amount of power to be sent to a wireless power receiver is variously changed, and there may be a method for controlling a resonance frequency using the same.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
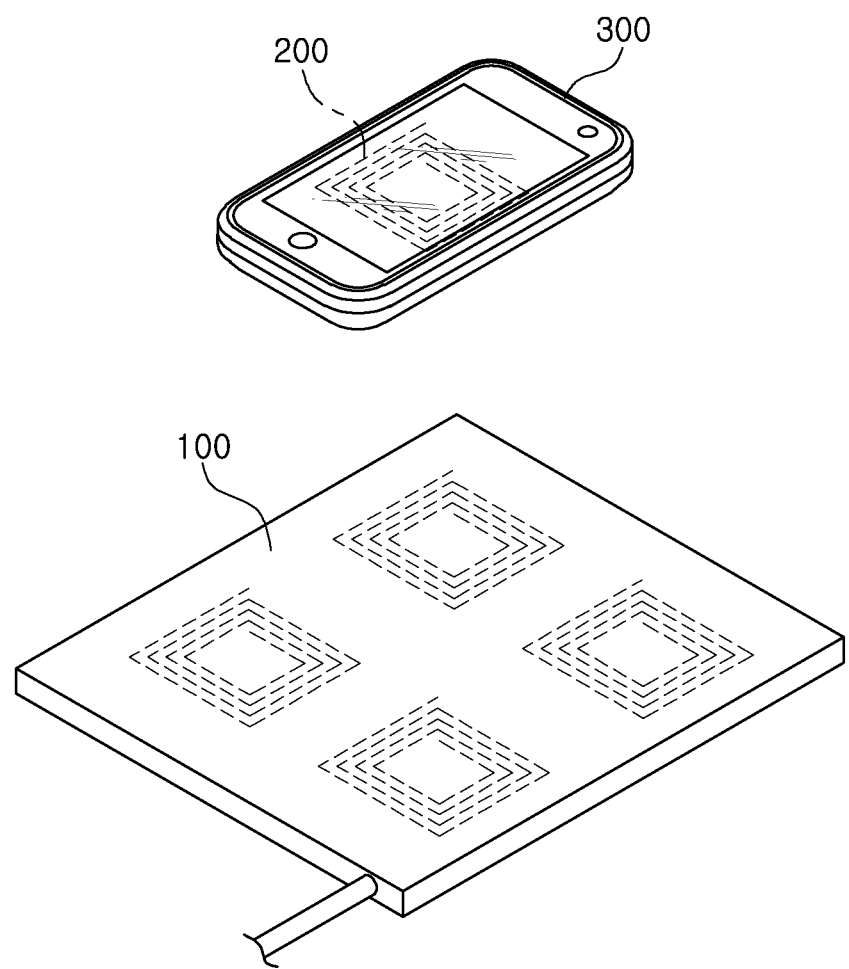
FIG. 1 is a diagram illustrating an example of a wireless power receiver and a wireless power transmitter.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, various embodiments will be described with reference to schematic views illustrating embodiments of the present inventive concept. In the drawings, for example, due to manufacturing techniques and/or tolerances, modifications of the shape shown may be estimated. Thus, the embodiments should not be construed as being limited to the particular shapes of regions shown herein, for example, to include a change in shape results in manufacturing. The following embodiments may also be constituted by one or a combination thereof.

FIG. 1 is a diagram illustrating an example of a wireless power receiver and a wireless power transmitter.

In an example illustrated in FIG. 1, a wireless power receiver 200 may be connected to a mobile terminal 300. The wireless power receiver 200 may wirelessly receive power from a wireless power transmitter 100 and may provide the power to the mobile terminal 300. The wireless power receiver 200 may be applied to various electronic devices other than the mobile terminal 300, such as wearable mobile technology, tablets, microcomputers, RFIDs, etc.

The wireless power transmitter 100 may include multiple resonators. Thus, if the wireless power receiver 200 is positioned in varying locations above or in the vicinity of the wireless power transmitter 100, the wireless power transmitter 100 may provide the power to the wireless power receiver 200.

The wireless power receiver 200 may change an amount of power which is requested of and/or sent by the wireless power transmitter 100 due to a change in an operating state, environmental changes, etc. Alternatively or additionally, the wireless power transmitter 100 may change the amount of power which is sent by the wireless power transmitter 100 or requested by the wireless power receiver 200. For example, in a case in which a user uses the mobile terminal 300 while simultaneously charging the wireless power receiver 200, wirelessly provided power requested from the mobile terminal 300 and/or sent to wireless power receiver 200 may be increased. Additionally or alternatively, in a case in which the position of the wireless power receiver 200 or the mobile terminal 300 is changed, the amount of power requested by the wireless power receiver 200 and/or sent by wireless power transmitter 100 may be changed.

A wireless power receiver 200 provides power even when power requested by the wireless power receiver 200 is changed, and a method for controlling the same will be described with reference to FIGS. 2 through 10.

Figure 2:
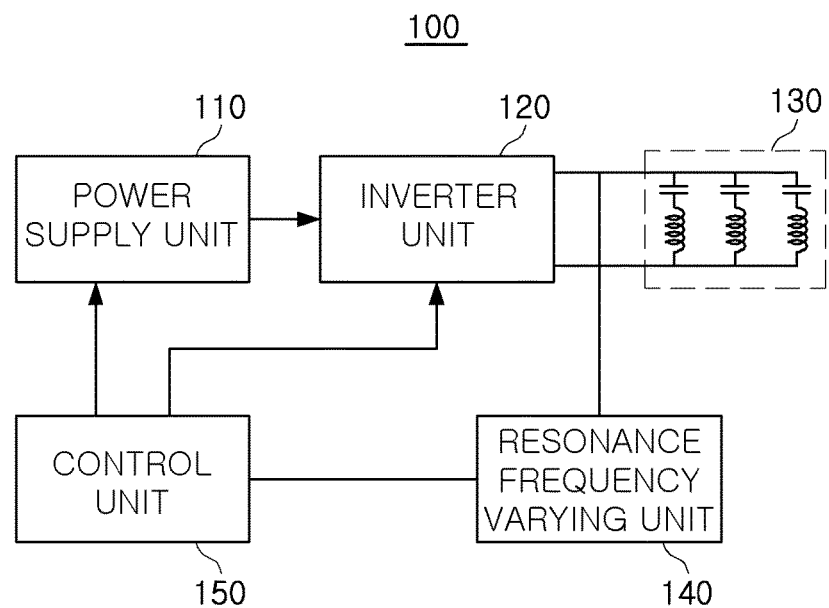
FIG. 2 is a block diagram illustrating a wireless power transmitter, according to an embodiment.

FIG. 2 is a block diagram illustrating an example of a wireless power transmitter. Referring to FIG. 2, a wireless power transmitter 100 includes resonators 130 and a resonance frequency varying unit 140. In an example, the wireless power transmitter 100 includes at least one of a power supply unit 110, an inverter unit 120, and a control unit 150.

The power supply unit 110 supplies power to be transmitted. For example, the power supply unit 110 includes a direct current (DC) to direct current (DC) converting circuit that varies a magnitude of an input voltage and outputs the varied input voltage.

The inverter unit 120 performs a switching operation to operate the resonators 130.

The resonators 130 are magnetically coupled to a resonator of the wireless power receiver to wirelessly provide the power to the wireless power receiver 200 (shown in FIG. 1).

The resonance frequency varying unit 140 varies resonance frequencies of resonators 130 in response to the change in the amount of power to be sent by the wireless power receiver 200.

For example, if the amount of power to be sent to the wireless power receiver 200 is above a threshold amount, the resonance frequency varying unit 140 increases the resonance frequency. As another example, if the amount of power to be sent to the wireless power receiver 200 is below a threshold amount, the resonance frequency varying unit 140 decreases the resonance frequency.

The control unit 150 controls operations of the power supply unit 110 and the inverter unit 120.

The control unit 150 controls an output of the power supply unit 110. For example, in response to the change in the amount of power to be sent to wireless power receiver 200, the control unit 150 controls the power supply unit 110 so that the output of power from the power supply unit is changed.

The control unit 150 may control a switching operation of the inverter 120. For example, the control unit 150 may control the inverter unit 120 so that the inverter unit 120 performs the switching operation at a set operating frequency.

The control unit 150 identifies the amount of power to be sent to the wireless power receiver 200. The control unit 150 may provide amount of power to be sent to the wireless power receiver 200 to the resonance frequency varying unit 140.

As an example, the above-mentioned amount power to be sent to the wireless receiver 200 may be received from the wireless power receiver 200 in a communications scheme of an in-band scheme in which a wireless power signal is modulated and demodulated to be transmitted. That is, since the wireless power signal formed between the wireless power receiver 200 and the wireless power transmitter 100 forms a closed loop within an electric field or a magnetic field, if the wireless power receiver 200 modulates the wireless power signal while receiving the wireless power signal, the wireless power transmitter 100 may sense the modulated wireless power signal. The wireless power transmitter 100 demodulates the modulated wireless power signal to identify the amount of power to be sent to wireless power receiver 200.

As another example, the wireless power receiver 200 outputs an amount of power to be sent to wireless power receiver 200 to the wireless power transmitter 100 using a short-distance wireless communications scheme.

The control unit 150 may include a processing unit. Depending on the exemplary embodiments, the control unit 150 may further include a memory. Here, the processing unit may include, for example, a central processing unit (CPU), a graphic processing unit (GPU), a microprocessor, an application specific integrated circuit (ASIC), field programmable gate arrays (FPGA), and the like, and may have a plurality of cores. The memory may be a volatile memory (e.g., RAM, or the like), a non-volatile memory (e.g., a ROM, a flash memory, or the like), or a combination thereof.

Figure 3:
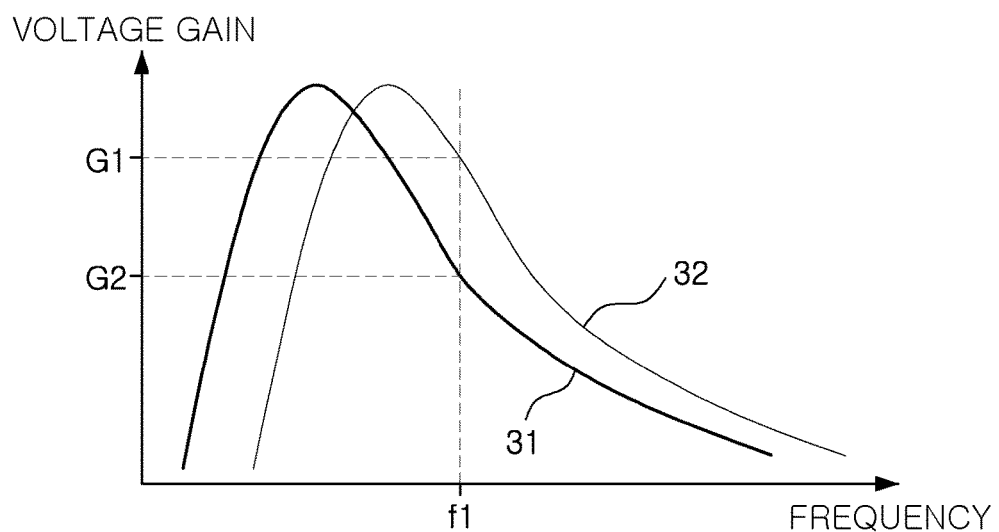
FIG. 3 is a graph illustrating a resonance frequency and a voltage gain of the wireless power transmitter of FIGS. 1 and 2, according to an embodiment.

FIG. 3 is a graph illustrating an example of a resonance frequency and a voltage gain of the wireless power transmitter 100. Reference numeral 31 indicates a curve of a voltage gain of the wireless power transmitter 100 at a low resonance frequency, and reference numeral 32 indicates a curve of the voltage gain of the wireless power transmitter 100 at a high resonance frequency.

In FIG. 3, an operating frequency of the inverter unit 120 (illustrated in FIG. 2) may be f1, and an example in which the inverter unit 120 is operated in a fixed frequency scheme is illustrated.

As illustrated, in a case in which the operating frequency f1 is fixed, it may be seen that the voltage gain G1 at the high resonance frequency 32 is greater than the voltage gain G2 at the low resonance frequency 31. The resonance frequency in a current wireless power transfer standard has a characteristics curve similar to those illustrated in FIG. 3, and a range of the operating frequency defined by the current wireless power transfer standard is also present at the right of the characteristics curve such as the operating frequency f1.

Thus, the voltage gain may be increased by changing the resonance frequency of the wireless power transmitter 100 in response to the change in the amount of power to be sent to a wireless power receiver 200 thereby efficiently providing the power. This may also be applied to a case in which a type of the wireless power receiver 200 is changed, the wireless power receiver 200 changes position, and/or the wireless power transmitter 100 changes position.

The resonance frequency f1 may be expressed by the following Equation 1.

$$f_r = \frac{1}{2\pi\sqrt{L_r C_r}} \qquad \text{[Equation 1]}$$

Where fr is the resonance frequency, Lr is inductance of the resonator of the wireless power transmitter 100, and Cr is capacitance of the resonators 130.

Thus, the resonance frequency may be increased by decreasing the capacitance or the inductance of the resonators 130 of the wireless power transmitter 100, or the resonance frequency may be decreased by increasing the capacitance or the inductance of the resonators 130 of the wireless power transmitter 100.

Hereinafter, an example of a wireless power transmitter in which the resonance frequency is adjusted by varying the capacitance will be described with reference to FIGS. 4 through 9. However, it should be appreciated that, the resonance frequency may be additionally or alternatively be adjusted by varying the inductance, which may be understood with reference to the following description.

Figure 4:
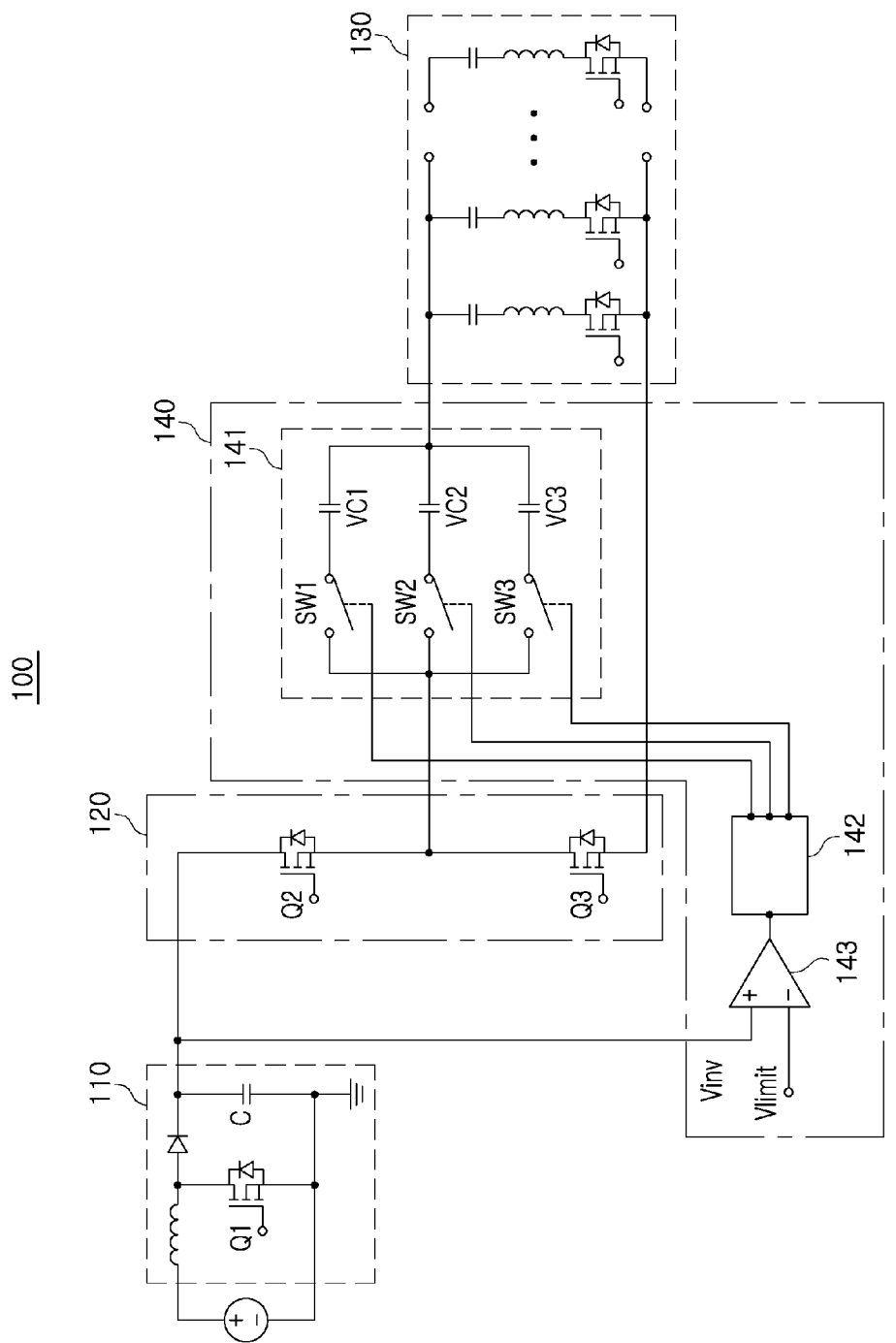
FIG. 4 is a circuit diagram illustrating a wireless power transmitter, according to an embodiment.

FIG. 4 is a circuit diagram illustrating an example of a wireless power transmitter.

The wireless power transmitter 100 illustrated in FIG. 4 relates to an example in which the resonance frequency of the resonator is varied based on a change in an input voltage of the inverter unit 120.

Referring to FIG. 4, the wireless power transmitter 100 includes the power supply unit 110, the inverter unit 120, the plurality of resonators 130, and the resonance frequency varying unit 140.

The power supply unit 110 may transform an input voltage Vinv and may output the transformed input voltage. As shown in FIG. 4, in the power supply unit 110, a step-up DC/DC converter in which the power supply unit 110 may include an inductor L, a first switch Q1, a diode D, and a capacitor C. However, the power supply unit 110 is not necessarily limited to a step-up DC/DC converter, and a step-up DC/DC converter is not necessarily limited to the configuration shown in FIG. 4. That is, various kinds of DC/DC converters, such as a step-down DC/DC converter, may be alternatively or additionally applied.

The first switch Q1 of the power supply unit 110 may be controlled by the control unit 150 (illustrated in FIG. 2), and the power supply unit 110 may vary an output according to a switching operation of the first switch Q1.

The inverter unit 120 may invert a direct current voltage output from the power supply unit 110 into an alternating current voltage for a wireless power transfer. As shown in FIG. 4, the inverter unit 120 may include a half-bridge inverter in which two switches Q2 and Q3 are connected to each other in series. However, the inverter unit 120 is not necessarily limited to this configuration. That is, inverter unit 120 may include different types of inverters, such as a full-bridge inverter.

The resonators 130 may be magnetically coupled to a resonator of the wireless power receiver to wirelessly provide the power to the wireless power receiver. For example, the alternating current voltage output from the inverter unit 120 may generate a magnetic field by the resonator, and the generated magnetic field may be induced into the resonator of the wireless power receiver, thereby transferring the power to a receiving side.

Each of the plurality of resonators 130 may include a switch. The control unit 150 (illustrated in FIG. 2) may control a switching operation of the switch so that some resonators are not operated.

The resonators 130 may each have the same resonance characteristics. For example, the resonators 130 may have the same resonance frequency setting. In this case, resonance frequencies of resonators 130 may be simultaneously changed by an operation of the resonance frequency varying unit 140. As such, in the case in which the resonators 130 have the same resonance characteristics, a degree of freedom for the position of the wireless power receiver may be increased.

The resonance frequency varying unit 140 may vary the resonance frequencies of the resonators 130 in response to the change in the amount of power to be sent to the wireless power receiver 200. In the illustrated example, the resonance frequency varying unit 140 may vary the resonance frequencies of resonators 130 by varying capacitance levels of the resonators 130.

As shown in FIG. 4, the resonance frequency varying unit 140 includes a variable capacitor 141 and a capacitance controller 142. One terminal of the variable capacitor 141 may be connected to the resonators 130. As an example, the variable capacitor 141 may be connected to respective capacitors of the resonators 130 in series, and the other terminal of the variable capacitor 141 may be connected to an output terminal of the inverter unit 120. The capacitance of the variable capacitor 141 may be varied by an operation of the capacitance controller 142. Thus, combined capacitance of the variable capacitor 141 and the plurality of resonators 130 may also be varied.

The variable capacitor 141 may include a switches SW1 to SW3, and capacitors VC1 to VC3 connected to the plurality of switches in series, respectively.

The plurality of capacitors VC1 to VC3 may have different capacitance levels. For example, a first capacitor VC1 may have a set capacitance, a second capacitor VC2 may have a capacitance equal to twice the capacitance of the first capacitor, and the third capacitor VC3 may have capacitance equal to five times the capacitance of the first capacitor. Accordingly, since a combination of various combined capacitors for the plurality of capacitors VC1 to VC3 may be implemented, various variable capacitance levels may also be provided by a small number of capacitors.

The capacitance controller 142 may adjust the capacitance of the variable capacitor 141, depending on a comparison result 143 between the input voltage of the inverter unit 120 and a threshold value.

Figure 5:
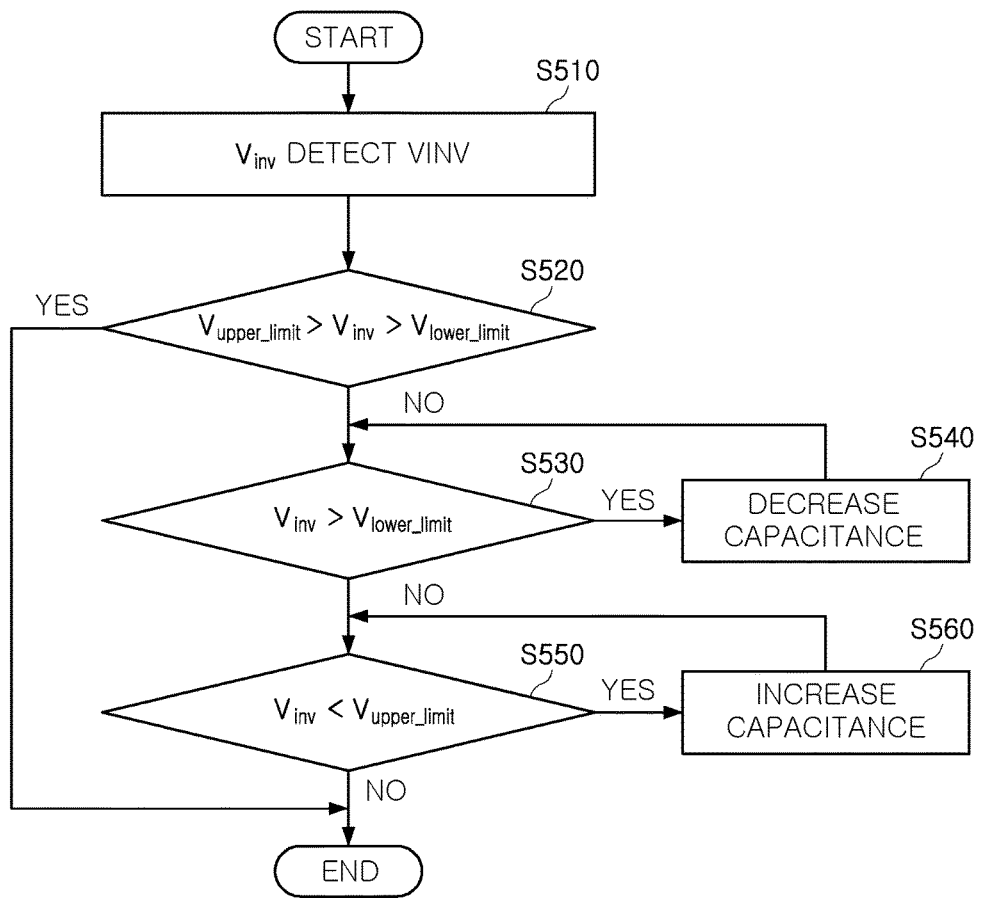
FIG. 5 is a flow chart illustrating a method of varying capacitance performed by the wireless power transmitter of FIG. 4, according to an embodiment.
Figure 6:
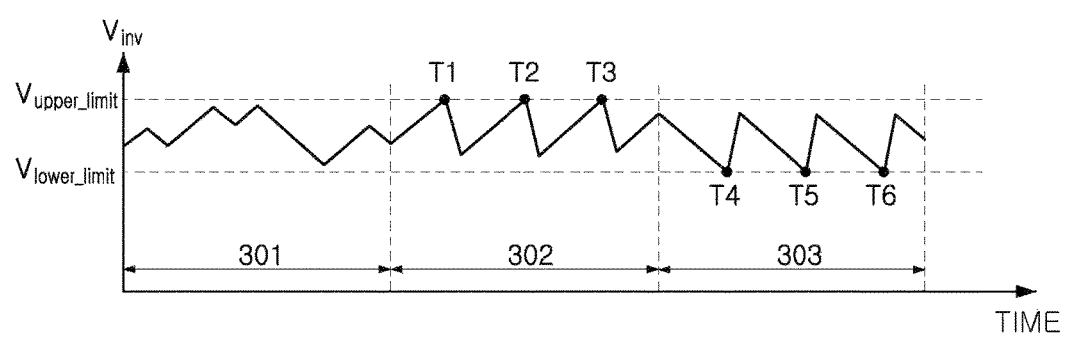
FIG. 6 is a graph illustrating the method of varying capacitance of FIG. 5, according to an embodiment.

FIG. 5 is a flow chart illustrating an example of a method of varying capacitance performed in the wireless power transmitter illustrated in FIG. 4 and FIG. 6 is a graph illustrating an example of the method of varying capacitance illustrated in FIG. 5. Hereinafter, an operation of the capacitance controller will be described with reference to FIGS. 4 through 6.

A comparator 143 may compare an input voltage Vinv of the inverter unit 120 with a voltage threshold Vlimit and may then transfer the comparison result to the capacitance controller 142.

The capacitance controller 142 may adjust the capacitance of the variable capacitor 141 depending on the comparison result of the comparator 143. The capacitance controller 142 may be implemented in various schemes such as a processor, program instructions performed by the processor, a software module, a microcode, a computer program product, a logic circuit, an application specific integrated circuit, or firmware.

First, referring to FIGS. 4 and 5, if the input voltage Vinv of the inverter unit 120 is detected (S510), the comparator 143 may compare the detected input voltage Vinv of the inverter unit 120 with a set voltage threshold Vlimit and may transfer the comparison result to the capacitance controller 142.

The voltage threshold Vlimit may include an upper voltage limit threshold Vupper_limit and a lower voltage limit threshold Vlower_limit. If the input voltage Vinv of the inverter unit 120 is a value between the upper voltage limit threshold Vupper_limit and the lower voltage limit threshold Vlower_limit (yes in S520), the capacitance controller 142 may not vary capacitance.

If the input voltage Vinv of the inverter unit 120 exceeds the upper voltage limit threshold Vupper_limit (yes in FIG. 530), the capacitance controller 142 may control the variable capacitor 141 so that the capacitance of the variable capacitor 141 is decreased (S540).

If the input voltage Vinv of the inverter unit 120 is less than the lower voltage limit threshold Vlower_limit (yes in S550), the capacitance controller 142 may control the variable capacitor 141 so that the capacitance of the variable capacitor 141 is increased (S560). Steps S510-S560 may be repeated periodically.

Referring further to FIG. 6, a section 301 may be a state in which the input voltage Vinv of the inverter unit 120 is between the upper voltage limit threshold Vupper_limit and the lower voltage limit threshold Vlower_limit. Since the input voltage of the inverter unit 120 is varied, but is not outside of the thresholds in this state, there is no change in capacitance. Thus, the section 301 may correspond to a section in which no resonance frequency is changed.

A section 302 is a section in which a charging distance or a charging angle is increased and the amount of power to be sent to wireless power receiver 200 is gradually increased. Accordingly, the capacitance is varied at timings at which the input voltage Vinv of the inverter unit 120 exceed the upper voltage limit threshold Vupper_limit, that is, timings T1, T2, and T3.

That is, since the amount of power to be sent to wireless power receiver 200 is gradually increased, the capacitance controller 142 may decrease the capacitance of the variable capacitor 141 so that the resonance frequency is increased. Since the resonance frequency is increased as capacitance is decreased, the increase in the amount of power to be sent to wireless power receiver 200 may be realized.

A section 303 is a section in which a charging distance or a charging angle is decreased and the amount of power to be sent to wireless power receiver 200 is gradually decreased. It may be seen that the capacitance is varied at timings at which the input voltage Vinv of the inverter unit 120 is less than the lower voltage limit threshold Vlower_limit, that is, timings T4, T5, and T6.

That is, since the amount of power to be sent to wireless power receiver 200 is gradually decreased, the capacitance controller 142 may decrease the resonance frequency by increasing the capacitance of the variable capacitor 141. Since the resonance frequency is decreased as the capacitance is increased, the decrease in the amount of power to be sent to wireless power receiver 200 may be realized.

According to FIGS. 4-6, resonance frequency may be changed in response to the change of the input voltage of the inverter unit 120.

Hereinafter, an example in which the resonance frequency is changed in response to a change of an input current of the power supply unit 110 will be described with reference to FIGS. 7 through 9.

Figure 7:
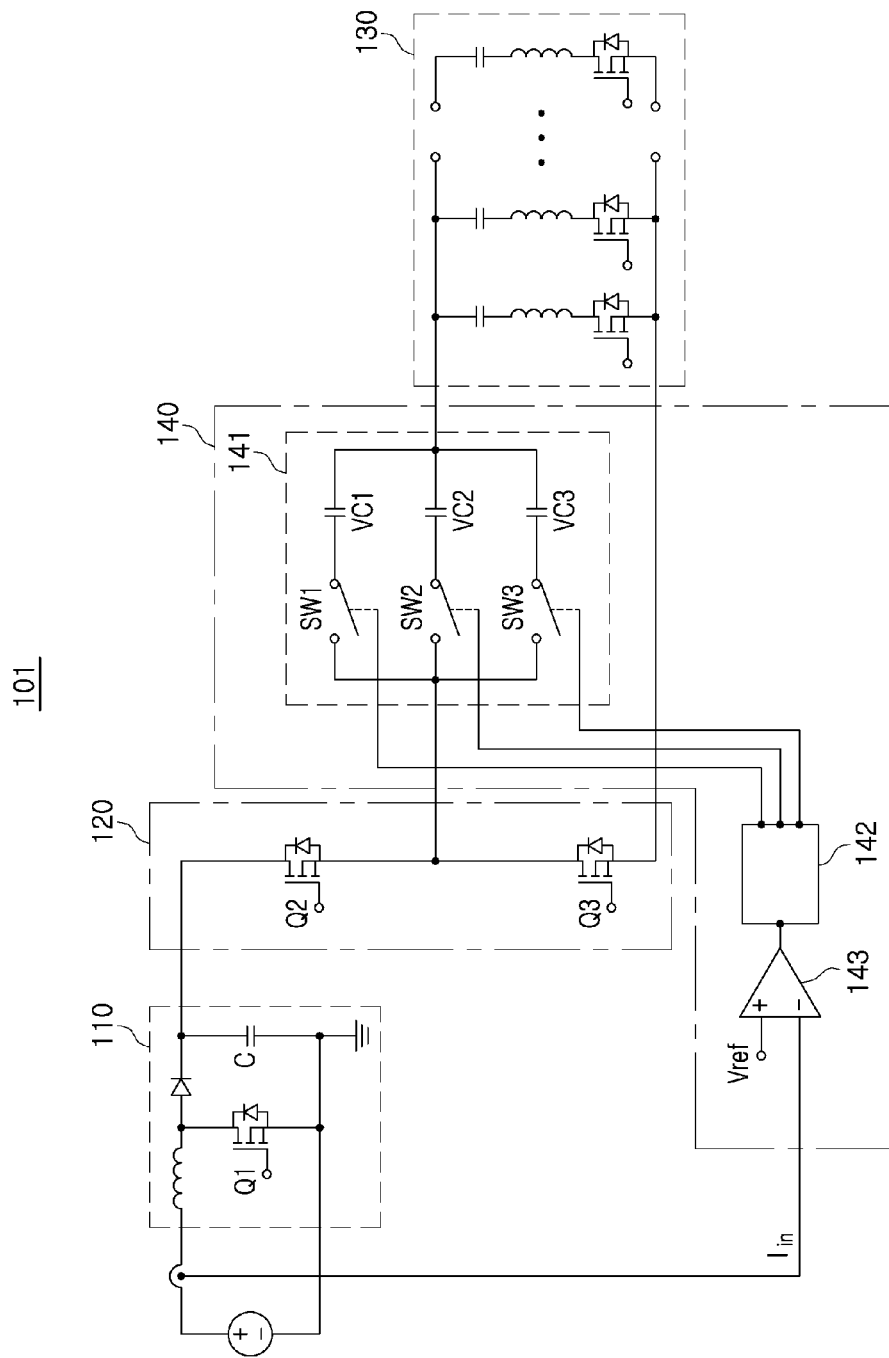
FIG. 7 is a circuit diagram illustrating a wireless power transmitter, according to an embodiment.

FIG. 7 is a circuit diagram illustrating an example of a wireless power transmitter 101.

Comparing wireless power transmitter 101 illustrated in FIG. 7 with the exemplary embodiment of FIG. 4, there is a difference that a capacitance varying unit 142 varies capacitance in response to the input voltage of the power supply unit 110.

Thus, hereinafter, a capacitance varying unit and a method of varying capacitance according the wireless power transmitter 101 will be described with reference to FIGS. 8 and 9. Other components may have operations and configurations similar to those of FIGS. 4 through 6.

Figure 8:
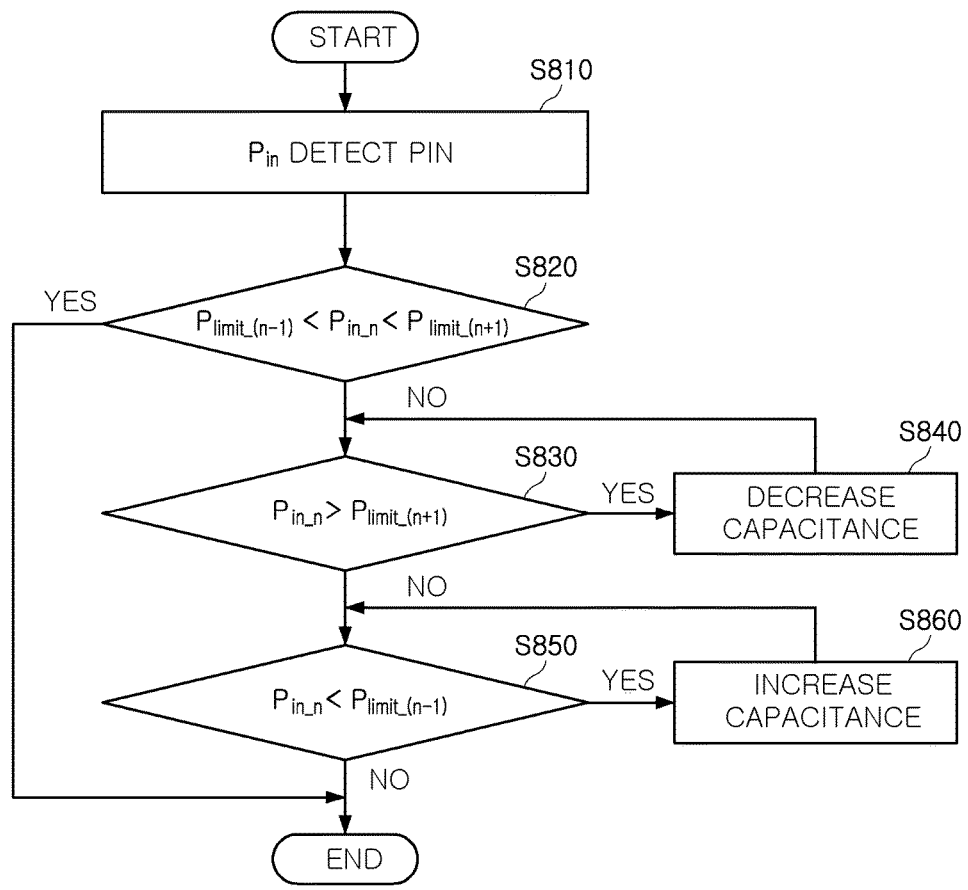
FIG. 8 is a flow chart illustrating a method of varying capacitance performed in the wireless power transmitter illustrated in FIG. 7, according to an embodiment.

FIG. 8 is a flow chart illustrating a method of varying capacitance performed in the wireless power transmitter 101 illustrated in FIG. 7.

Figure 9:
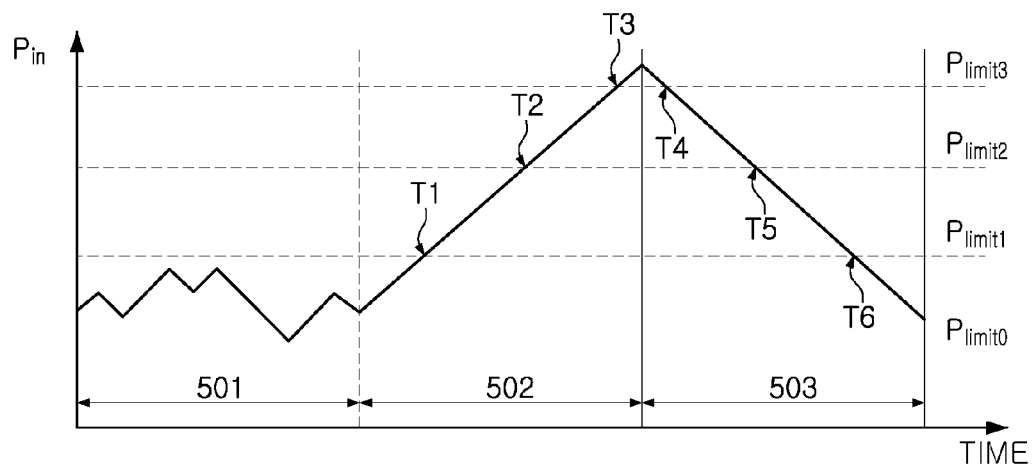
FIG. 9 is a graph illustrating the method of varying capacitance illustrated in FIG. 8, according to an embodiment.

Referring to FIGS. 7 through 9, if an input current Iin of the power supply unit 110 is detected (S810), the comparator 143 may compare the detected input current Iin of the power supply unit 110 with a preset current threshold Ilimit_n and may transfer the comparison result to the capacitance varying unit 142. The current threshold Ilimit_n may include a thresholds Ilimit0 to Ilimit3 depending on the number of capacitors C1 to C3 configuring the variable capacitor, but is not limited thereto.

If a current value Iin_n of the input current Iin of the power supply unit 110 is present between preset current thresholds Ilimit_(n−1) and Ilimit_(n+1) (yes in S850), the capacitance varying unit 142 may not vary the capacitance. That is, this may be a section corresponding to a section 501 of FIG. 9. It may be seen that the current value Iin_n of the input current Iin is present between the current thresholds Ilimit_0 and Ilimit_1.

If the current value Iin_n of the input current Iin of the power supply unit 110 exceeds a current upper limit threshold Ilimit(n+1) (yes in S830), the capacitance varying unit 142 may control the variable capacitor 141 so that the capacitance of the variable capacitor 141 is decreased (S840).

This may be a section corresponding to a section 502 of FIG. 9, where a charging distance or a charging angle is increased and amount of power to be sent to wireless power receiver 200 is gradually increased. Thus, the capacitance varying unit 142 may decrease the capacitance of the variable capacitor 141 in order to increase the resonance frequency (840).

That is, in FIG. 9, the capacitance of the variable capacitor may be decreased at timings T1, T2, and T3 at which the current value Iin_n of the input current Iin exceeds current upper limit values Ilimit1, Ilimit2, and Ilimit3.

If the current value Iin_n of the input current Iin of the power supply unit 110 is less than a current lower limit threshold Ilimit(n−1) (yes in S850), the capacitance varying unit 142 may control the variable capacitor 141 so that the capacitance of the variable capacitor 141 is increased (S860).

This may be a section corresponding to a section 503 of FIG. 9, where the amount of power to be sent to wireless power receiver 200 is gradually decreased. Thus, the capacitance varying unit 142 may increase the capacitance of the variable capacitor 141 in order to decrease the resonance frequency (S860).

That is, the capacitance of the variable capacitor may be increased at timings T4, T5, and T6 at which the current value Iin_n of the input current Iin is lower than current lower limit values Ilimit3, Ilimit2, and Ilimit1.

As described above, the resonance frequency is adjusted by varying the capacitance of the resonator using the variable capacitor connected to the resonator. However, examples are not limited there to, and it will be appreciated by one having skill in the art, upon understanding of this application, that the resonance frequency may be adjusted by varying inductance of the resonator.

Steps S810-S860 may be repeated periodically.

Figure 10:
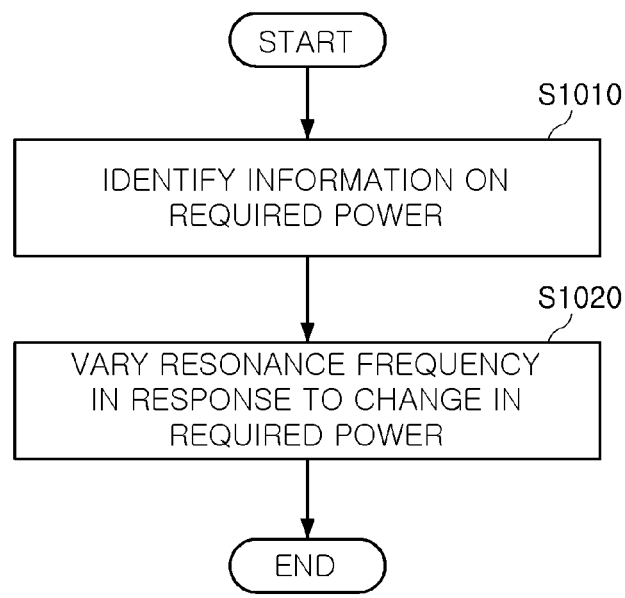
FIG. 10 is a flow chart illustrating a method for controlling a resonance frequency, according to an embodiment.

FIG. 10 is a flow chart illustrating an example of a method for controlling a resonance frequency.

A method for controlling a resonance frequency to be described below is a method for controlling the wireless power transmitters described above with reference to FIGS. 4 through 8.

Referring to FIG. 10, the wireless power transmitter may identify information about amount of power to be sent to the wireless power receiver from the wireless power receiver (S1010).

Additionally or alternatively, in operation S1010, the wireless power transmitter may receive the information about the amount of power to be sent to the wireless power receiver in an in-band scheme in a state in which the wireless power transmitter is magnetically coupled to the wireless power receiver through a wireless power signal.

In operation S1010, the wireless power transmitter may additionally or alternatively identify the information on about the amount of power to be sent to the wireless power receiver from the wireless power receiver using a separate short-range wireless communications line.

Thereafter, the wireless power transmitter may vary the resonance frequency of the wireless power transmitter in response to a change in the amount of power to be sent to the wireless power receiver (S1020).

The wireless power transmitter may include resonators and at least one variable capacitor varying capacitance levels of the resonators. The operation S1020 may include an operation of varying resonance frequencies of the resonators by varying the capacitance levels of the resonators.

If the amount of power to be sent to the wireless power receiver is increased by a predetermined amount or more, the wireless power transmitter may increase the resonance frequency. This is to perform a counteraction by increasing the voltage gain in the case in which the power to be sent to the wireless power receiver is increased, because the voltage gain is increased at the same operating frequency in the case in which the resonance frequency is increased, as described above with reference to FIG. 3.

If the amount of power to be sent to the wireless power receiver is decreased by the predetermined amount or more, the wireless power transmitter may decrease the resonance frequency. This is to perform a counteraction by decreasing the voltage gain in the case in which the amount of power to be sent to the wireless power receiver is decreased, because the voltage gain is decreased at the same operating frequency in the case in which the resonance frequency is decreased, as described above with reference to FIG. 3.

If the amount of power to be sent to the wireless power receiver is increased, the wireless power transmitter may increase the input voltage of the inverter. If the input voltage of the inverter is increased by a predetermined threshold level or more, the wireless power transmitter may increase the resonance frequencies of the resonators. For example, the wireless power transmitter may increase the resonance frequencies by decreasing the capacitance levels of the plurality of resonators.

If the amount of power to be sent to the wireless power receiver is decreased, the wireless power transmitter may decrease the input voltage of the inverter. If the input voltage of the inverter is decreased by the predetermined threshold or more, the wireless power transmitter may decrease the resonance frequencies of the plurality of resonators. For example, the wireless power transmitter may decrease the resonance frequencies by increasing the capacitance levels of the plurality of resonators.

As set forth above, the wireless power transmitter may perform wireless charging even in the environment in which the amount of power to be sent to the wireless power receiver is variously changed.

Although the above method and devices have been shown, for example, in FIG. 1, as being applicable to a single wireless power receiver 200 and a single wireless power transmitter 100, this is merely exemplary. For example, the embodiments, configurations, and principles described above may also be applicable to a power-sharing arrangement which may include multiple wireless power receivers, and/or multiple wireless power transmitters, and/or devices that perform as both wireless power receivers and wireless power transmitters.

The apparatuses, units, modules, devices, and other components illustrated in FIGS. 2, 4, and 7 that perform the operations described herein with respect to FIGS. 2, 4 and, 7 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2, 4, and 7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 10 that perform the operations described herein with respect to FIG. 10 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art, upon careful reading and understanding of the present disclosure, can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD- ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
   resonators electrically connected to each other; and
   a resonance frequency varying unit configured to vary resonance frequencies of the resonators based on a change in an amount of power to be sent to a wireless power receiver from the wireless power transmitter,
   wherein upon the amount of power to be sent to the wireless power receiver being an amount greater than or equal to a first threshold value, the resonance frequency varying unit is configured to increase the resonance frequencies of the resonators, and upon the amount of power to be sent to the wireless power receiver being an amount less than or equal to a second threshold value which is smaller than the first threshold value, the resonance frequency varying unit is configured to decrease the resonance frequencies of the resonators.

2. The wireless power transmitter of claim 1, wherein the resonance frequency varying unit varies the resonance frequencies of the resonators by varying capacitance levels of the resonators.

3. The wireless power transmitter of claim 1, further comprising an inverter unit configured to operate the resonators by performing a switching operation,
   wherein the resonance frequency varying unit is configured to vary the resonance frequencies of the resonators based on a change in a received voltage from the inverter unit.

4. The wireless power transmitter of claim 1, further comprising:
   a power supply unit configured to transform a received voltage and output the transformed input voltage; and
   an inverter unit configured to receive an output of the power supply unit and operate the resonators by performing a switching operation.

5. The wireless power transmitter of claim 4, wherein the resonance frequency varying unit is configured to vary the resonance frequencies of the resonators based on a change in a received current from the power supply unit.

6. The wireless power transmitter of claim 4, further comprising a control unit configured to identify the amount of power to be sent to the wireless power receiver and control the output of the power supply unit based on the identified amount of power to be sent to the wireless power receiver.

7. The wireless power transmitter of claim 3, wherein the resonance frequency varying unit comprises:
   a variable capacitor having a first terminal electrically connected to the resonators; and
   a capacitance controller configured to adjust a capacitance of the variable capacitor depending on a comparison result between a received voltage from the inverter unit and a set threshold voltage.

8. The wireless power transmitter of claim 7, wherein the variable capacitor has a second terminal electrically connected to an output terminal of the inverter unit.

9. The wireless power transmitter of claim 7, wherein the resonators are electrically connected in parallel.

10. A method for controlling a resonance frequency, the method comprising:
    identifying an amount of power to be sent from a wireless power transmitter to a wireless power receiver; and
    varying a resonance frequency of the wireless power transmitter in response to a change in the amount of power to be sent to the wireless power receiver,
    wherein the varying of the resonance frequencies of the resonators comprises increasing the resonance frequencies when amount of power to be sent to the wireless power receiver is greater than or equal to a first threshold amount and decreasing the resonance frequencies when the amount of power to be sent to the wireless power receiver is less than or equal to a second threshold amount which is smaller than the first threshold amount.

11. The method of claim 10, wherein the wireless power transmitter comprises:
    resonators, and a one variable capacitor configured to vary capacitance levels of the resonators, and
    the varying of the resonance frequency of the wireless power transmitter comprises varying resonance frequencies of the resonators by varying the capacitance levels of the resonators.

12. The method of claim 10, wherein the varying of the resonance frequencies of the resonators comprises:
    increasing an input voltage of an inverter when the amount of power to be sent to the wireless power receiver is increased; and
    increasing the resonance frequencies of the resonators upon the input voltage of the inverter being greater than or equal to a threshold voltage.

13. The method of claim 10, wherein the varying of the resonance frequencies of the resonators comprises:
    decreasing an input voltage of an inverter when the amount of power to be sent to the wireless power receiver is decreased; and increasing the resonance frequencies of the resonators upon the input voltage of the inverter being greater than or equal to a threshold voltage.

14. The method of claim 10, wherein the resonators are electrically connected in parallel.

\* \* \* \* \*